United States Patent [19]
Frische

[11] Patent Number: 5,396,798
[45] Date of Patent: Mar. 14, 1995

[54] MECHANICAL RESONANCE, SILICON ACCELEROMETER

[75] Inventor: Richard H. Frische, Phoenix, Ariz.

[73] Assignee: Honeywell Inc., Minneapolis, Minn.

[21] Appl. No.: 48,096

[22] Filed: Apr. 15, 1993

[51] Int. Cl.[6] ............................................. G01P 15/08
[52] U.S. Cl. ............................. 73/517 R; 73/516 LM
[58] Field of Search ...... 73/517 R, 517 AV, 516 LM, 73/522

[56] References Cited

U.S. PATENT DOCUMENTS

| | | | |
|---|---|---|---|
| 4,553,436 | 11/1985 | Hansson | 73/517 R |
| 4,744,863 | 5/1988 | Guckel et al. | 156/653 |
| 4,853,669 | 8/1989 | Guckel et al. | 338/4 |
| 4,882,933 | 11/1989 | Petersen et al. | 73/517 R |
| 4,897,360 | 1/1990 | Guckel et al. | 437/901 |
| 4,928,203 | 5/1990 | Swindal et al. | 73/517 AV |
| 4,996,082 | 2/1991 | Guckel et al. | 427/99 |
| 5,006,487 | 4/1991 | Stokes | 73/517 AV |
| 5,013,693 | 5/1991 | Guckel et al. | 437/428 |
| 5,090,254 | 2/1992 | Guckel et al. | 73/517 AV |
| 5,101,664 | 4/1992 | Hockaday et al. | 73/704 |

Primary Examiner—Hezron E. Williams
Assistant Examiner—Helen C. Kwok
Attorney, Agent, or Firm—John G. Shudy, Jr.

[57] ABSTRACT

A silicon accelerometer includes several silicon layers. The silicon layers form two silicon beams supported by flexure members. An acceleration responsive silicon mass is arranged to bend the flexure members in response to accelerations. The silicon beams are vibrated in vacuum chambers and gas damping is provided for the acceleration responsive mass and the flexure members. Sensing electronics detect vibration of the two silicon beams.

32 Claims, 8 Drawing Sheets

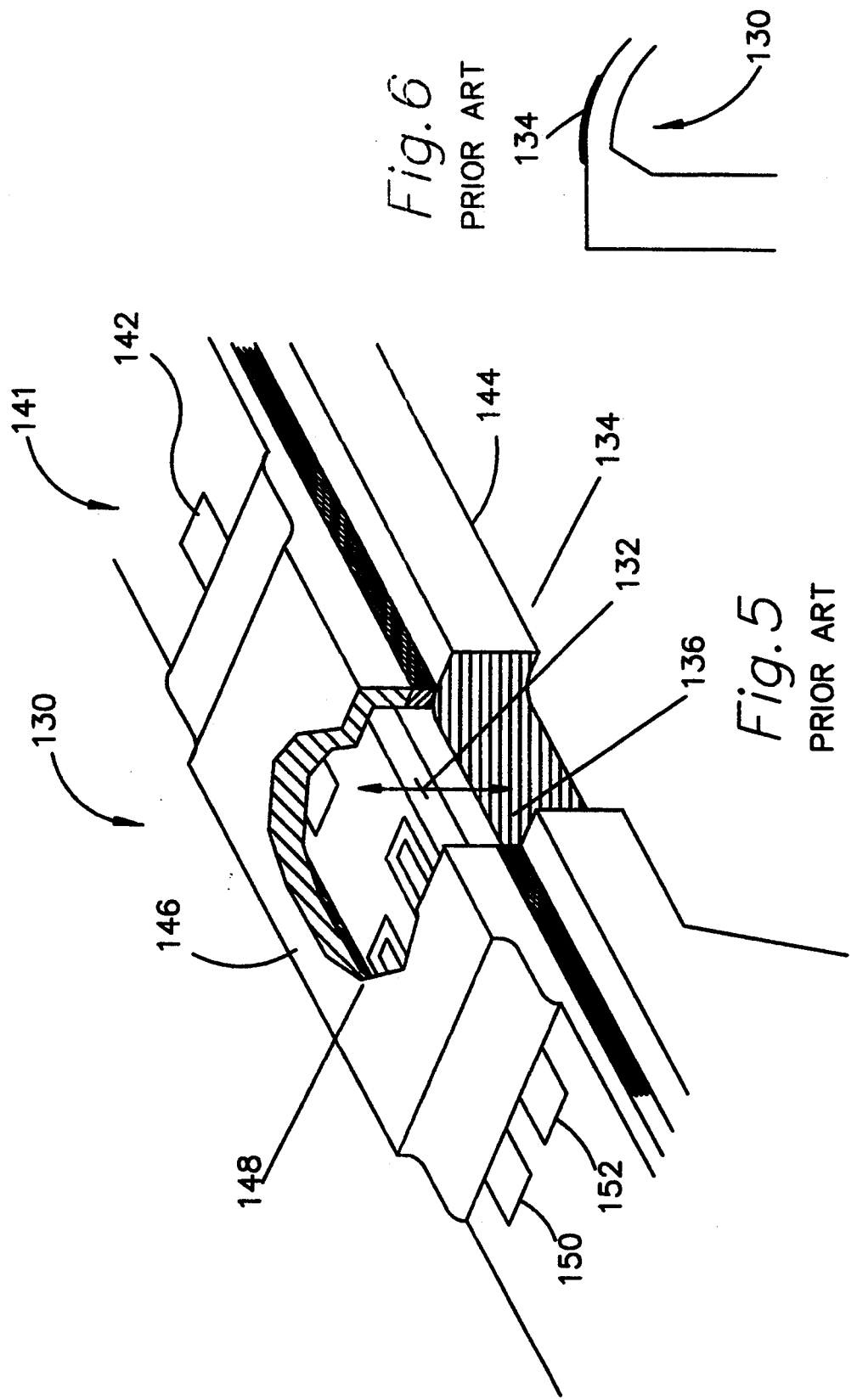

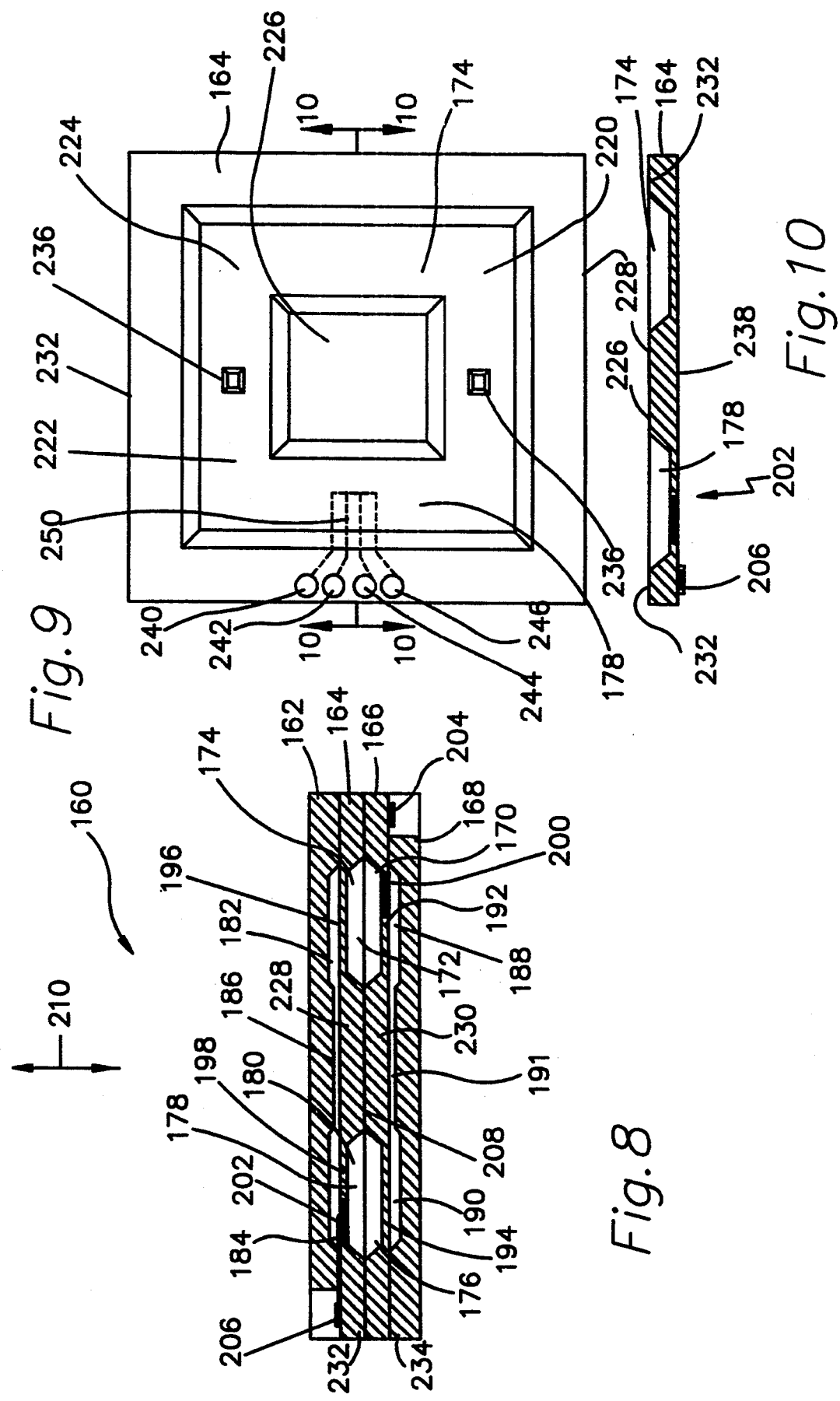

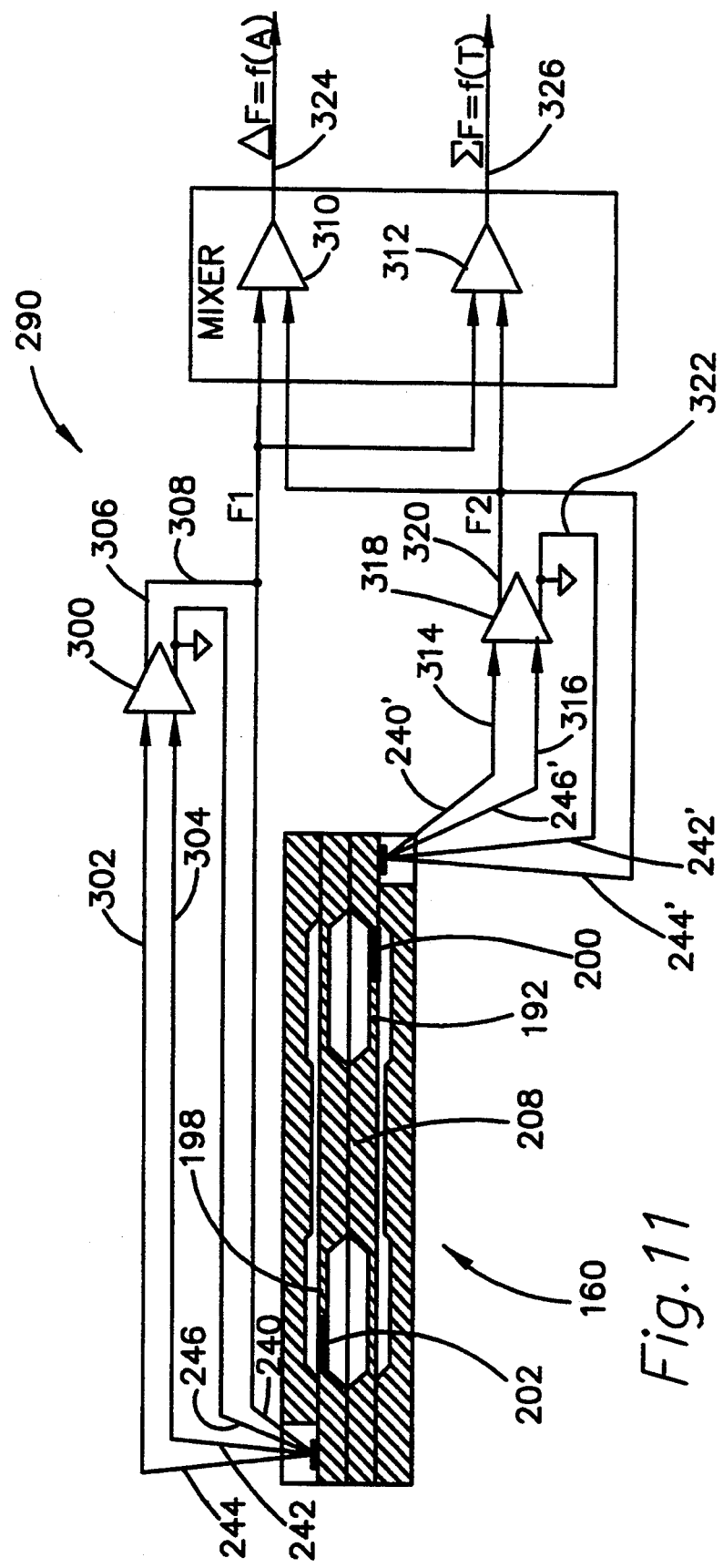

MECHANICAL RESONANCE, SILICON ACCELEROMETER

TECHNICAL FIELD OF THE INVENTION

The present invention relates to accelerometers and, more particularly, to vibrating silicon beam sensors arranged to sense acceleration.

BACKGROUND OF THE INVENTION

An accelerometer is a device which senses acceleration, as well as shocks and vibrations, along or about an input or sensitive axis. One type of such an accelerometer is a mechanical resonating accelerometer which senses linear accelerations parallel to, or along, an input axis. If acceleration is to be sensed three-dimensionally, a triad of such accelerometers is arranged such that a first accelerometer senses acceleration along the x coordinate axis, a second accelerometer senses acceleration along the y coordinate axis, and a third accelerometer senses acceleration along the z coordinate axis.

A linear accelerometer typically includes a damped seismic mass which is positionally constrained by spring forces. In response to an acceleration, the seismic mass moves relative to its support and, when the acceleration ends, the seismic mass is returned to its initial position by the spring forces. The displacement of the seismic mass due to acceleration is converted into an electrical output by various types of transducers in order to produce a measure of the acceleration.

For example, in a potentiometric accelerometer, the transducer is a potentiometer having a resistance held in a fixed position with respect to a support surface. A wiper arm of the potentiometer is driven by a mechanical linkage connected between a seismic mass and the wiper arm. As the seismic mass moves in response to accelerations, the mechanical linkage moves the wiper arm over the resistance of the potentiometer to change the electrical output from the potentiometer. This change in electrical output provides an indication of the amount and direction of acceleration.

An inductive type accelerometer typically uses an inductance bridge sensitive to the motion of a seismic mass. As the seismic mass moves in response to accelerations, the seismic mass drives a ferromagnetic armature with respect to two inductive coils resulting in an increase of the inductance of one inductive coil and a decrease of the inductance of the other inductive coil. The difference in inductances between the two inductive coils provides an indication of the amount and direction of acceleration.

A strain gauge accelerometer includes a seismic mass attached to a strain gage which may be fabricated out of metal wire, metal foil or semiconductors. Servo accelerometers and piezoelectric accelerometers are also known. In piezoelectric accelerometers, a seismic mass is mechanically connected to a crystal material which may be comprised of quartz or of such ceramic mixtures as titanate, niobate, or zirconate.

A typical prior art mechanical resonating linear accelerometer generally utilizes at least one, and more often two, quartz beams and is a rather complex mechanical assembly. In such a quartz beam linear accelerometer, a quartz beam is caused to vibrate at a base frequency. The quartz beam converts its mechanical vibration into an electrical signal which has a frequency which tracks the frequency of the mechanical vibration. In the presence of acceleration, the vibration frequency of the quartz beam changes and this change in vibration frequency provides an indication of the amount and direction of acceleration experienced by the quartz beam accelerometer.

If the quartz beam linear accelerometer employs two quartz beams, the two quartz beams are generally arranged so that, in the presence of an acceleration along an input (i.e. sensitive) axis, one of the quartz beams experiences an increase in vibration frequency and the other quartz beam experiences a decrease in vibration frequency. The difference between these vibration frequencies of the two quartz beams provides an indication of the amount and direction of acceleration along the input axis. Quartz beams which are arranged in this push/pull manner benefit from common mode rejection wherein changes in vibration frequency of one quartz beam in response to such environmental factors as temperature and pressure are negated by equal changes in vibration frequency of the other quartz beam.

Quartz beam accelerometers have several disadvantages. For example, in assembling a quartz beam accelerometer, the quartz beams are typically bonded or glued between a support and a seismic mass thereby creating undesirable stresses and other problems resulting from thermal expansions. These stresses and problems adversely affect the performance of the accelerometer. Moreover, quartz beams normally have a high Q when operating in a vacuum. However, when used in an accelerometer, such quartz beams often are required to operate in a chamber where a level of gas pressure is usually maintained for the purpose of gas damping the seismic mass suspension structure. Unfortunately, this gas pressure also damps the resonating quartz beams which thereby decreases the Q, and, therefore, the stability, of the vibrating quartz frequency. (The quantity Q as used herein is a quality factor relating to the stability of a vibrating device; that is, Q is generally defined as one-half of the kinetic and potential energy stored in a vibrating beam divided by the energy lost by a vibrating beam per vibration cycle. If the energy applied by a force to the vibrating beam at a given point in time is equal to the total energy (i.e. the sum of the kinetic and potential energies of the beam) stored in the beam at that point in time, the vibrating beam has no loss; however, any difference between this applied energy and the total energy of the vibrating beam is the energy lost by the vibrating beam. Furthermore in response to acceleration, the frequency of the quartz beam can change by only approximately 10% of its base frequency through its useful range, i.e. a quartz beam having a base frequency of 40,000 Hz., for example, is limited to a 4,000 Hz. variation in response to acceleration.

SUMMARY OF THE INVENTION

The resonating silicon beam accelerometer of the present invention allows silicon processing techniques to be employed in fabricating the silicon beam accelerometer and thus avoids many of the disadvantages and complexities of prior art quartz and silicon beam accelerometers. The resonating silicon beam accelerometer may be constructed using cost effective photolithographic techniques common to the silicon industry and results in an essentially monolithic structure. Thus, there are no glued or bonded joints which create stresses on the vibrating silicon sensing beams due to thermal expansion. The construction of the resonating silicon beam accelerometer of the present invention permits gas damping of the seismic mass suspension structure of the accelerometer while at the same time permitting the silicon beam to vibrate in a vacuum chamber such that there is no interference between the use of a damping gas for the seismic mass suspension system and the Q of the vibrating silicon beam. Accordingly, the Q of the vibrating silicon beam can be maintained at a high level. Furthermore, the vibration frequency of the silicon beam of the resonating silicon beam accelerometer of the present invention can vary by over 300% of its base frequency in response to acceleration.

An accelerometer according to one aspect of the present invention includes first, second, third, and fourth silicon layers wherein each of the silicon layers has first and second surfaces. The second surface of the second silicon layer and the first surface of the third silicon layer are recessed to form first and second cavities and an acceleration responsive mass between the first and second cavities. The first and second cavities define (a) first and second silicon flexure members in the first surface of the second silicon layer, respectively and (b) third and fourth silicon flexure members in the second surface of the third silicon layer respectively. The first silicon layer has first and second recesses in the second surface thereof, the first recess being arranged so that the first flexure member separates the first cavity and the first recess, and the second recess being arranged so that the second flexure member separates the second cavity and the second recess. The fourth silicon layer has third and fourth recesses in the first surface thereof, the third recess being arranged so that the third flexure member separates the first cavity and the third recess, and the fourth recess being arranged so that the fourth flexure member separates the second cavity and the fourth recess. A first means senses bending of the first flexure member, and a second means senses bending of the fourth flexure member.

An accelerometer according to another aspect of the invention includes first, second, third, and fourth silicon layers wherein each of the silicon layers has first and second surfaces. The second surface of the second silicon layer and the first surface of the third silicon layer are recessed to form a first continuous cavity surrounding an acceleration responsive mass. The first continuous cavity forms a first flexure member in the first surface of the second silicon layer and a second flexure member in the second surface of the third silicon layer. The acceleration responsive mass is arranged to bend the first and second flexure members in response to acceleration. The first silicon layer has a second continuous cavity in the second surface thereof. The second continuous cavity is arranged so that the first flexure member separates the first and second continuous cavities. The fourth silicon layer has a third continuous cavity in the first surface thereof. The third continuous cavity is arranged so that the second flexure member separates the first and third continuous cavities. First and second sensing means sense bending of the first and second flexure members respectively, and the first and second sensing means are arranged with respect to one another for achieving common mode rejection.

An accelerometer according to a further aspect of the invention includes a first vibrating beam supported by a first flexure member, and a second vibrating beam supported by a second flexure member. An acceleration responsive mass is arranged to bend the first and second flexure members in at least first and second directions in response to accelerations. A damping means damps the first and second flexure members and the acceleration responsive mass. The damping means includes a gas. Vacuum chambers are provided within which the first and second vibrating beams vibrate. The vacuum chambers are isolated from the gas. First and second sensing means sense vibration of the first and second vibrating beams, respectively.

A silicon accelerometer according to a still further aspect of the invention includes a first silicon vibrating beam supported by a first silicon flexure member, and a second silicon vibrating beam supported by a second silicon flexure member. An acceleration responsive silicon mass is arranged to bend the first and second silicon flexure members in at least first and second directions in response to accelerations. A damping means surrounds the first and second silicon flexure members and the acceleration responsive mass in order to damp the acceleration responsive silicon mass. The damping means includes a gas. Vacuum chambers are provided within which the first and second silicon vibrating beams vibrate, the vacuum chambers being isolated from the gas. Sensing means sense vibration of the first and second silicon vibrating beams, respectively.

BRIEF DESCRIPTION OF THE DRAWING

These and other features and advantages will become more apparent from a detailed consideration of the invention when taken in conjunction with the drawing in which:

FIGS. 5, 6 and 7 show a known silicon sensor which forms the basis of the accelerometer according to the present invention;

FIG. 8 is a cross-sectional side view of an accelerometer according to the present invention;

FIG. 9 is a top view of one of the mass/suspension/-beam (m/s/b) layers of the accelerometer shown in FIG. 8;

FIG. 10 is a cross-sectional side view taken along lines 10—10 of FIG. 9;

FIG. 11 shows a circuit arrangement for driving the vibrating silicon beams of the accelerometer shown in FIG. 8 and for detecting the vibration frequency thereof;

DETAILED DESCRIPTION

Figures 1, 2:
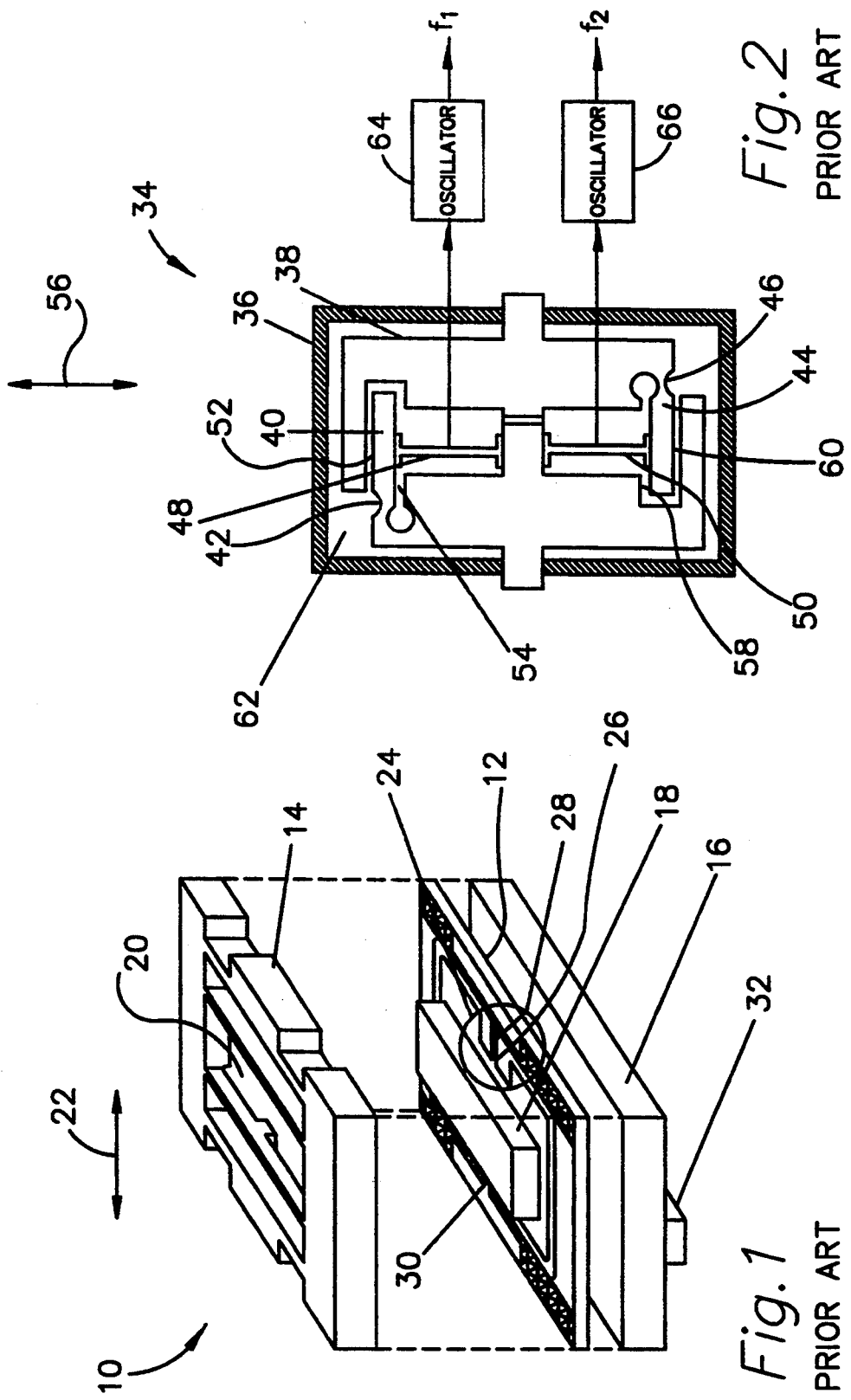
FIG. 1 shows a prior art push-pull quartz beam accelerometer.
FIG. 2 shows another prior art push-pull quartz beam accelerometer.

A prior art push-pull quartz beam accelerometer 10 is shown in FIG. 1 and includes an active plate 12 supported between a top support plate 14 and a lower support plate 16. Located on the active plate 12 is a seismic mass 18. The upper support plate 14 has a central opening 20 in order to receive the seismic mass 18. The top support plate 14 is arranged to limit the travel of the seismic mass 18 along the input (i.e. sensitive) axis depicted by a directional arrow 22. The active plate 12 is formed of a quartz material having a first opening 24 and a second opening 26 defining a first quartz beam 28 therebetween. Similar openings on an opposite side of the active plate 12 define a second quartz-beam 30. A mounting bar 32 is included in association with the lower support plate 16 in order to mount the quartz beam accelerometer 10 to a platform.

The quartz beams 28 and 30 are driven (by a driver not shown) into vibration at a predetermined frequency. As acceleration is experienced by the quartz beam accelerometer 10, the seismic mass 18 responds to this acceleration by pushing one of the quartz beams 28 and 30 into compression and pulling the other of the quartz beams 28 and 30 into tension. The vibration frequencies of the quartz beams 28 and 30 thus change oppositely to one another and this differential change in vibration frequency is sensed in order to provide an indication of the amount of acceleration experienced by the push-pull quartz beam accelerometer 10.

Shown in FIG. 2 is another prior art dual vibrating quartz beam accelerometer 34. The dual vibrating quartz beam accelerometer 34 includes a housing 36 which supports a vibrating beam support assembly 38. A first pendulum 40 is suspended by the support assembly 38 by way of a hinge 42 and a second pendulum 44 is suspended by the beam support mechanism 38 by way of a hinge 46. A first vibrating quartz beam 48 is suitably attached between the pendulum 40 and the beam support assembly 38 and a second vibrating quartz beam 50 is suitably attached between the second pendulum 44 and the beam support assembly 38. The beam support assembly 38 is configured to provide gaps 52 and 54 between the first pendulum 40 and the beam support 38 in order to limit travel of the pendulum 40 in either direction of the input axis of the accelerometer 34 depicted by a directional arrow 56. By the same token, the support assembly 38 is configured to provide gaps 58 and 60 between the second pendulum 44 and the beam support 38 in order to limit the travel of the pendulum 44 in either direction along the input axis depicted by the directional arrow 56. The beam support assembly 38 also provides gas film damping surfaces that cooperate with the surfaces of the pendulums to damp the pendulums 40 and 44.

The quartz beams 48 and 50 are driven into vibration at a base frequency. As the accelerometer 34 experiences acceleration along its input axis depicted by the directional arrow 56, one of the quartz beams 48 and 50 is pushed into compression by its corresponding pendulum, and the other of the quartz beams 48 and 50 is pulled into tension by its corresponding pendulum. For example, if the accelerometer 34 is accelerated in the upward direction as viewed in FIG. 2, the pendulums 40 and 44 tend to rotate downward with respect to the beam support 38. This rotation of the pendulums 40 and 44 pushes the quartz beam 48 into compression and pulls the quartz beam 50 into tension. The resulting change in the forces acting on the quartz beams 48 and 50 differentially alters the vibration frequencies of the quartz beams 48 and 50. That is, as in the case of the accelerometer 10 shown in FIG. 1, the vibration frequency of the quartz beam 48 decreases and the vibration frequency of the quartz beam 50 increases. This differential frequency change is sensed by oscillators 64 and 66 in order to provide an indication of the amount of acceleration experienced by the accelerometer 34.

Figure 3:
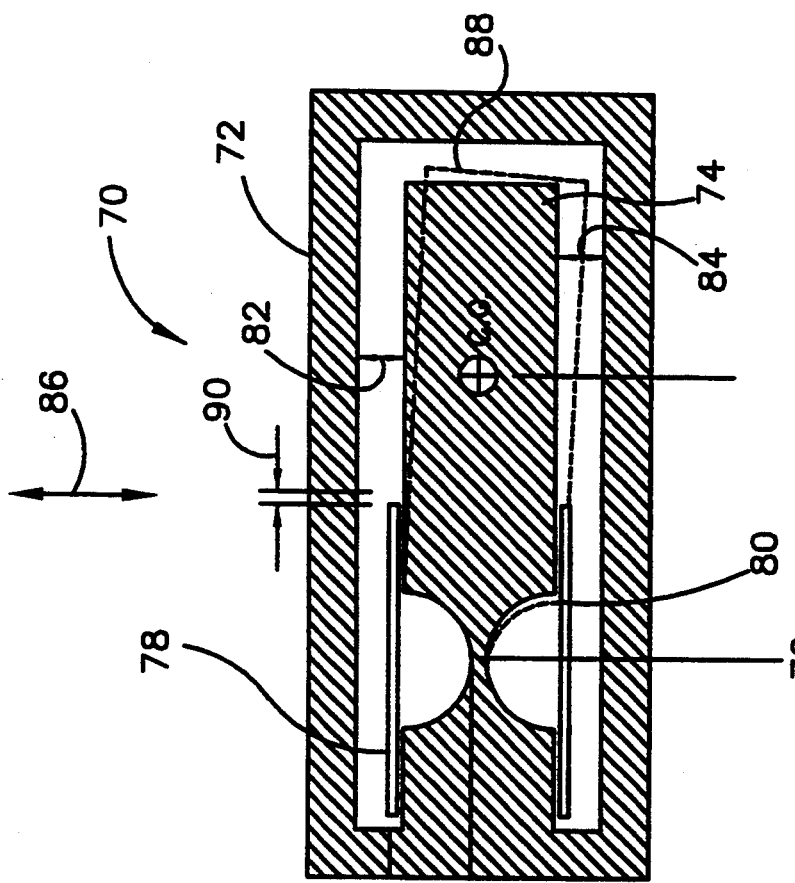
FIG. 3 shows a prior art double ended quartz beam tuning fork accelerometer.

FIG. 3 illustrates a prior art double-ended tuning fork quartz beam accelerometer 70. The accelerometer 70 includes a housing 72 containing a seismic mass 74 attached to the housing 72 by a hinge 76. A first quartz beam 78 spans the hinge area 76, on one side of the seismic mass 74, from the housing 72 to the seismic mass 74. A second quartz beam 80 similarly spans the hinge area 76, on the opposite side of the seismic mass 74, from the housing 72 to the seismic mass 74. The housing 72 and the seismic mass 74 are configured to provide a pair of gaps 82 and 84 between the seismic mass 74 and the housing 72. These gaps act as shock caging gaps in order to limit travel of the seismic mass 74 resulting from accelerations along the input axis of the accelerometer 70 depicted by a directional arrow 86. The housing 72 also provides gas film damping surfaces that cooperate with the surfaces of the seismic mass to damp the seismic 74.

The quartz beams 78 and 80 are typically driven at a base vibration frequency by a source of electrical energy. As the seismic mass 74 pivots about the hinge 72 in response to an acceleration along the input axis depicted by the directional arrow 82, the seismic mass 74 pivots about the hinge 76 which causes the seismic mass 74 to assume the position shown by the dotted line 88 in FIG. 3. If the movement of the seismic mass 74 is downward as shown in FIG. 3, the quartz beam 78 is stretched by an amount 90, and the quartz beam 80 is compressed by a similar amount. As the seismic mass 74 so pivots in either direction along its input axis, the seismic mass 74 pushes one of the quartz beams 78 and 80 into compression and pulls the other of the quartz beams 78 and 80 into tension. This change in the tension and compression of the quartz beams 78 and 80 results in a differential change of the vibration frequencies of the quartz beams 78 and 80. This differential change of the vibration frequencies of the quartz beams 78 and 80 provides an indication of the amount of the acceleration.

Figure 4:
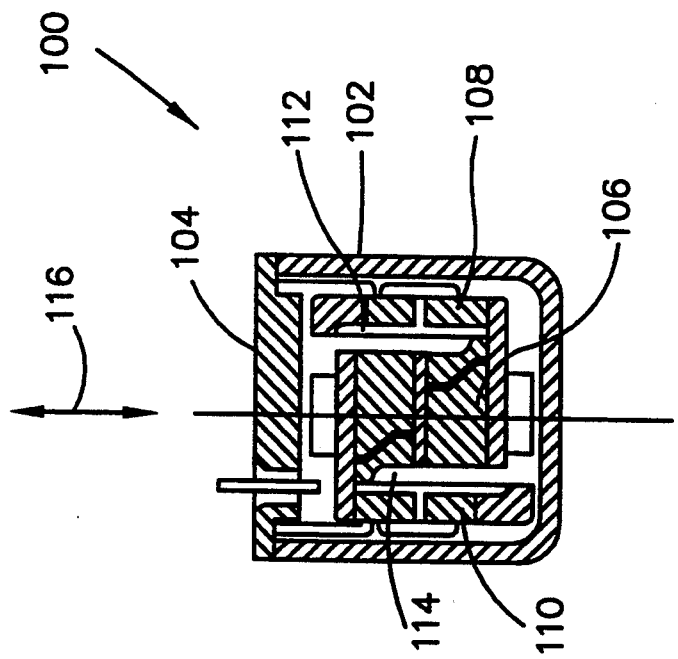
FIG. 4 shows another prior art accelerometer.

As shown in FIG. 4, another prior art accelerometer 100 includes a housing 102 and a cover 104. Within the housing 102 is a seismic mass 106 suspended by seismic mass supports 108 and 110. A first quartz beam 112 is attached at one end to the seismic mass support 108 and at the other end to the seismic mass 106. A second quartz beam 114 is attached at one end to the seismic mass support 110 and at the other end to the seismic mass 106. As the accelerometer 100 experiences accelerations along its input axis depicted by a directional arrow 116, the seismic mass 106 moves to push one of the quartz beams 112 and 114 into compression and pull the other of the quartz beams 112 and 114 into tension.

The quartz beams 112 and 114 may be electrically vibrated at a base frequency. As the accelerometer 100 experiences acceleration, the seismic mass 106 moves to push one of the quartz beams 112 and 114 into compression and to pull the other of the quartz beams 112 and 114 into tension which results in a differential change in the vibration frequencies of the quartz beams 112 and 114. This differential vibration frequency change provides an indication of the amount of acceleration experienced by the accelerometer 100.

Such prior art accelerometers employ either stiffened flexure members to support the seismic mass or a damping gas in order to avoid undesirable sensitivities to vibration. If stiffened flexure members are employed, the sensitivity of the accelerometer is traded off against the desired lower frequency response of the accelerometer. If a damping gas is used, the internal volume of the accelerometer housing is filled with a damping gas at a pressure which is selected to provide the proper amount of damping for the seismic mass or the pendulum of the accelerometer. As discussed above, this gas has the unfortunate result that, not only is the seismic mass or pendulum damped, but the vibrating quartz beams are also damped. Damping of the vibrating quartz beams decreases the Q of the accelerometer. A decrease in Q reduces the frequency stability of the vibrating quartz beams.

Furthermore, the accelerometers of FIGS. 1-4 are mechanically complex assemblies which are costly to manufacture and to assemble. The quartz beams included in these assemblies are typically bonded or glued into place which creates undesirable stresses and thermal expansion problems. Furthermore, a quartz beam, because it typically has a low tensile strength, has a limited range within which its vibration frequency can change. For example, a quartz beam having a base vibration frequency of 40,000 hertz is limited to a range of 4,000 hertz centered about its base frequency. A vibrating quartz beam will break if it is vibrated at a frequency above the upper frequency of this frequency range.

On the other hand, a silicon beam has a higher tensile strength and, therefore, can undergo a greater range of vibration frequency variation. Thus, a silicon beam can experience frequency variations on the order of 300% of the base frequency. When a vibrating silicon beam is used in an accelerometer, this greater range produces better resolution of the output signal which provides the indication of acceleration. A further advantage of using silicon vibrating beams is that the silicon accelerometer can be fabricated using cost effective photolithographic techniques common to the silicon industry.

Figure 7:
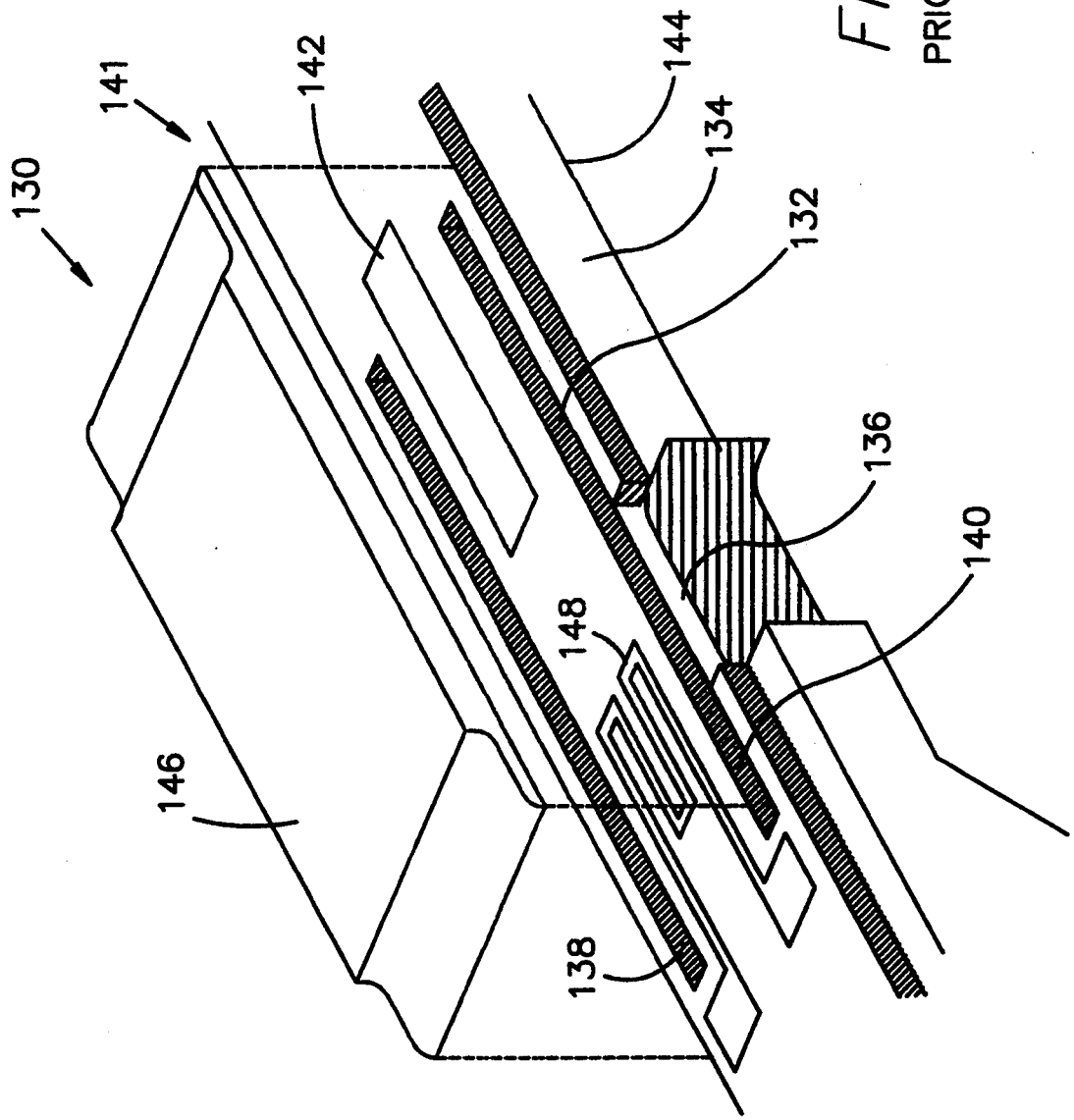

A silicon sensor 130, which may be used in the accelerometer of the present invention, is shown in FIGS. 5, 6 and 7. The silicon sensor 130 may be made by one or more of the processes shown in the following U.S. Pat. Nos. 4,744,863; 4,853,669; 4,897,360; 4,996,082; 5,013,693; and, 5,090,254. The silicon sensor 130 includes a thin silicon beam 132 of polysilicon material which may be deposited on a semiconducting crystalline silicon flexure member 134. The thickness of the silicon beam 132 may be on the order of two micrometers, for example. A vacuum chamber 136 is formed partially beneath the silicon beam 132. The vacuum chamber 136, together with a pair of slots 138 and 140, permit the silicon beam 132 to vibrate with a very high Q.

A drive capacitor 141 can be used to vibrate the silicon beam 132 at a base frequency. The drive capacitor 141 can be either a two electrode capacitor or, preferably, a three electrode capacitor. Only one capacitor electrode 142 of the drive capacitor 141 is shown in FIGS. 5 and 7. The electrode 142 may be a metal film suitably adhered to one of the surfaces of the silicon beam 132 or, preferably, the electrode 142 may be a doped region on the surface of the silicon beam 132. A second electrode (not shown) of the drive capacitor 141 can be similarly doped into the flexure member 134. A cover 146 is placed over at least a portion of the silicon beam 132 to complete the vacuum chamber 136 within which the silicon beam 132 vibrates. The cover 146 should have an interior recess of sufficient depth to permit the silicon beam 132 to vibrate in response to the drive capacitor 141. A third electrode (not shown) can be supported by the cover 146. For example, if the cover 146 is a silicon cover, the third electrode may be doped into a surface of the cover 146 which faces the silicon beam 132. Finally, the silicon sensor 130 also includes a sensing piezoelectric resistor 148 which senses the vibration of the silicon beam 132 and which may be doped into the same surface of the silicon beam 132 into which the electrode 142 is doped. The piezoelectric resistor 148 has terminals 150 and 152.

In using the silicon sensor 130 in the accelerometer of the present invention, an alternating current may be supplied to the drive capacitor 141 in order to vibrate the silicon beam 132. If the drive capacitor 141 is a two electrode capacitor, an alternating current energizes the two electrodes of the drive capacitor 141 to produce an alternating electrostatic field in order to vibrate the silicon beam 132 at the frequency of the alternating current. If the drive capacitor 141 is a three electrode capacitor, an alternating current is applied across the upper capacitor electrode on the cover 146 and the lower capacitor electrode on the flexure member 134 so that an alternating electrostatic field exerts an alternating force on the silicon beam 132 to vibrate the silicon beam 132 at the frequency of the alternating current. The middle electrode 142 is connected to circuit ground.

The inputs of an oscillator amplifier (not shown in FIGS. 5-7) can be connected to the piezoelectric resistor 148 by way of the terminals 150 and 152, and the outputs of this oscillator amplifier can be connected to the electrodes of the drive capacitor 141 which vibrates the silicon beam 132. The resonant frequency at which the silicon beam 132 vibrates is determined by the strain on the silicon beam 132. Accordingly, the resistance value of the piezoelectric resistor 148 changes with changes in the resonant frequency of the silicon beam 132. Thus, the piezoelectric resistor 148 provides a signal to the oscillator amplifier wherein the frequency of this signal is the resonant frequency of the silicon beam 132. The amplifier provides an output to the capacitor 141 wherein the frequency of the output from the amplifier is the resonant frequency of the silicon beam 132. The drive capacitor 141 provides sufficient energy to sustain the vibration of the silicon beam 132.

Thus, the silicon sensor 130 can be used to sense forces which result in bending of the flexure member 134. That is, as a force causes the flexure member 134 to bend as shown in FIG. 6 so that the silicon beam 132 of the silicon sensor 130 lies on the outside surface of the curvature of the flexure member 134, the silicon beam 132 experiences an increase in tension causing its resonant frequency to increase. Likewise, as a force causes the flexure member 134 to bend so that the silicon beam 132 lies on the inside surface of the curvature of the flexure member 134, the silicon beam 132 experiences an increase in compression causing its resonant frequency to decrease.

The change in output frequency of the oscillator amplifier can be sensed as an indication of the amount, and the direction, of forces which are applied to the flexure member 134. Typical silicon beams formed on silicon flexures may have an unstressed base resonant frequency of from 500,000 hertz to 600,000 hertz. Under tension, this frequency swings as high as 2,000,000 hertz, and under compression this frequency swings as low as 150,000 hertz. This frequency range is a very large span of useful output, and can provide high resolution and high accuracy in many force sensing applications.

A pair of silicon sensors 130 can advantageously be used in a silicon accelerometer 160 shown in FIG. 8. The silicon accelerometer 160 is constructed of four crystalline silicon plates or layers 162, 164, 166 and 168.

The outer layers 162 and 168 act as cover layers and may be of identical geometric construction with respect to one another. The middle layers 164 and 166 are mass/suspension/beam layers and also may be of identical geometric construction with respect to one another. Anisotropic etching may be employed to form the recesses, the suspension flexures and the seismic mass in the cover layers 162 and 168 and in the m/s/b layers 164 and 166, as shown, before the layers 162, 164, 166, and 168 are assembled to form the accelerometer 160.

As viewed in FIG. 8, each of the layers 162-168 has an upper surface, i.e. a first surface, and a lower surface, i.e. a second surface. The first surface of the m/s/b layer 166 and the second surface of the m/s/b layer 164 may be etched or otherwise suitably processed to provide cooperating recesses 170 and 172 which are arranged to form a cavity 174 when the m/s/b layers 164 and 166 are assembled as shown in FIG. 8. Similarly, the first surface of the m/s/b layer 166 and the second surface of the m/s/b layer 164 may be etched or otherwise suitably processed to provide cooperating recesses 176 and 178 which are arranged to form a cavity 180. The cover layer 162 is provided with recesses 182 and 184 and a travel limit stop 186, and the cover layer 168 is provided with recesses 188 and 190 and a travel limit stop 191.

Sufficient silicon material remains in the second surface of the m/s/b layer 166 after formation of the recesses 170 and 176 to form flexure members 192 and 194, respectively. Similarly, sufficient silicon material remains in the first surface of the m/s/b layer 164 after formation of the recesses 172 and 178 to form flexure members 196 and 198, respectively. A first silicon sensor 130, including a silicon beam 132, a drive capacitor 141, a piezoelectric resistor 148, and a cover 146, is provided in a region 200 of the flexure member 192 of the same construction as the silicon sensor 130 shown in FIGS. 5-7. Thus, the flexure member 192 is the same as the flexure member 134 of the silicon sensor 130 of FIGS. 5-7. Similarly, a second silicon sensor 130, including a silicon beam 132, a drive capacitor 141, a piezoelectric resistor 148, and a cover 146, is provided in a region 202 of the flexure member 198 of the same construction as the silicon sensor 130 shown in FIGS. 5-7. Thus, the flexure member 198 is also the same as the flexure member 134 of the silicon sensor 130 of FIGS. 5-7.

A terminal pad 204 is provided on the second surface of the m/s/b layer 166 and suitable circuit paths on the second surface of the m/s/b layer 166 connect the terminal pad 204 to the drive capacitor 141 and the piezoelectric resistor 148 provided in the region 200 of the m/s/b layer 166. A similar terminal pad 206 is provided on the first surface of the m/s/b layer 164 and suitable circuit paths on the first surface of the m/s/b layer 164 connect the terminal pad 206 to the drive capacitor 141 and piezoelectric resistor 148 provided in the region 202 of the m/s/b layer 164. As will be discussed below, the terminal pads 204 and 206 provide the means for connecting the piezoelectric resistors 148 and the drive capacitors 141 in the regions 200 and 202 to respective oscillator amplifiers.

When the m/s/b layers are assembled as shown in FIG. 8, the recesses 170 and 176 in the m/s/b layer 166 and the recesses 172 and 178 in the m/s/b layer 164 form a seismic mass 208 between the cavities 174 and 180. The accelerometer 160 is assembled by bonding the layers 162, 164, 166 and 168 together using silicon dioxide/silicon thermoelectric bonds. As the accelerometer 160 experiences acceleration, the seismic mass 208 bends the flexure members 192 and 198 so that one of the silicon beams 132 in the regions 200 and 202 is on the outside surface of its corresponding flexure member and so that the other of the silicon beams 132 in the regions 200 and 202 is on the inside surface of its corresponding flexure member. Thus, one silicon beam 132 is in tension and the other silicon beam 132 is in compression. For example, if the accelerometer 160 is accelerated in the upward direction as viewed in FIG. 8, the seismic mass 208 bends the flexure member 192 so that the silicon beam 132 in the region 200 is on the inside surface of the curvature of the flexure member 192 and is, accordingly, in compression, and the seismic mass 208 bends the flexure member 198 so that the silicon beam 132 in the region 202 is on the outside surface of the curvature of the flexure member 198 and is, accordingly, in tension. Thus, the resonant frequencies of the silicon beams 132 in the regions 200 and 202 are decreased and increased, respectively. This differential change in the vibration frequencies may be sensed to provide an indication of the amount and direction of the acceleration.

The cavities 174 and 180, together with the recesses 182, 184, 188, and 190, may be filled with a damping gas in order to damp movement of the seismic mass 208 and to thereby decrease the sensitivity of the accelerometer 160 to vibration. Although many gases may be used for the damping gas in the cavities 174 and 180 and the recesses 182, 184, 188, and 190, it is preferable that the gas be inert and thermally conductive. The vacuum chambers 136 of the silicon sensors 130 in the regions 200 and 202, i.e. the vacuum chambers within which the silicon beams 132 vibrate, ensure a high Q for the accelerometer 160. Preferably, the cavities 174 and 180 and the recesses 182, 184, 188 and 190 are in gas communication with one another through suitable holes (not shown in FIG. 8) in the flexure members 192, 194, 196, and 198. The seismic mass 208 may move between the cover layers 162 and 168 but the extent of movement of the seismic mass 208 is limited by the travel limit stops 186 and 191, respectively.

Although the accelerometer 160 may be an elongated device having separate cavities 174 and 180, the accelerometer 160 is preferably a quadrilateral device. Accordingly, although only the top view of one of the layers 162, 164, 166, and 168 is shown in FIG. 9 (i.e. the m/s/b layer 164), it is understood that the other layers 162, 166 and 168 have the same quadrilateral shape. The first m/s/b layer 164 as shown in FIGS. 9 has two recesses 220 and 222 joining the recesses 174 and 178 to form one continuous recess 224. The continuous recess 224 is etched as a closed path in the second surface 226 of the first m/s/b layer 164. This etching results in a mesa 228 surrounded by the continuous recess 224. A similar mesa 230 (FIG. 8) is formed in the m/s/b layer 166. When the m/s/b layers 164 and 166 are assembled together as shown in FIG. 8 (such as by bonding a ridge 232 around an outside perimeter of the layer 164 to a ridge 234 around an outside perimeter of the layer 166), the mesa 228 in the m/s/b layer 164 and the corresponding mesa 230 in the m/s/b layer 166 form the seismic mass 208 shown in FIG. 8.

Holes 236 may be provided from the continuous recess 224 through a first surface 238 of the m/s/b layer 164 in order to provide for communication between the continuous recess 224 and the recesses 182 and 184 in the cover layer 162. Holes similar to the holes 236 may also be provided from the similar continuous recess in the m/s/b layer 166 through a first surface thereof in order to provide for communication between that continuous recess and the recesses 188 and 190 in the cover layer 168. Since the cover layers 162 and 168 are also quadrilateral, the recesses 182 and 184 form a continuous quadrilateral recess in the second surface of the cover layer 162, and the recesses 188 and 190 form a continuous quadrilateral recess in the first surface of the cover layer 168. Thus, the cavities 174 and 180, the recesses 182, 184, 188, and 190, and the holes 236 form one continuous gas chamber for containing a damping gas to damp movement of the seismic mass 208 and the flexure members 192 and 198.

The terminal pad 206 may be provided on the m/s/b layer 164 having terminals 240, 242, 244 and 246 for connection to the drive capacitor 141 and piezoelectric resistor 148 of the region 202 on the surface 238 of the m/s/b layer 164. The region 250 shown in FIG. 9 represents the drive capacitor 141/piezoelectric resistor 148 region of the silicon beam 132 in the region 202 on the m/s/b layer 164. The terminal 240 of the terminal pad 206 is connected to one electrode of a two electrode drive capacitor 141, and the terminal 246 is connected to the other electrode of the drive capacitor 141 (it being understood that an additional terminal in the terminal pad 206 is required if the drive capacitor 141 includes a third electrode). The terminal 242 is connected to the terminal 150 of the piezoelectric resistor 148 in the region 202 on the m/s/b layer 164, and the terminal 244 is connected to the terminal 152 of this piezoelectric resistor 148. Similar terminals of the terminal pad 204 on the m/s/b layer 166 are connected to the drive capacitor 141 and the piezoelectric resistor 148 in the region 200 on the m/s/b layer 166.

An oscillator amplifier circuit 290 is connected to the accelerometer 160 as shown in FIG. 11 in order to drive the silicon beams 132 in the regions 200 and 202 into vibration and to sense the resonant frequency of these silicon beams 132. This oscillator amplifier circuit 290 includes an oscillator amplifier 300 having its inputs 302 and 304 connected to the piezoelectric resistor 148 of the region 202 by way of the terminals 242 and 244. A first output 306 from the oscillator amplifier 300 is connected to one electrode of the drive capacitor 141 formed in the region 202 by way of the terminal 240. A second output 308 from the oscillator amplifier 300 is connected to ground and also to the other electrode of the drive capacitor 141 in the region 202 by way of the terminal 246. The output 306 from the amplifier 300 is also connected to a first input of an amplifier 310 and may be connected to a first input of an amplifier 312.

Similarly, the oscillator amplifier circuit 290 also includes an oscillator amplifier 318 having its inputs 314 and 316 connected to the piezoelectric resistor 148 of the region 200 by way of the terminals 240' and 246'. A first output 320 from the oscillator amplifier 318 is connected to one electrode of the drive capacitor 141 formed in the region 200 by way of the terminal 244'. A second output 322 from the oscillator amplifier 318 is connected to ground and also to the other electrode of the drive capacitor 141 in the region 200 by way of the terminal 242'. The output 322 from the amplifier 318 is also connected to a second input of the amplifier 310 and may be connected to a second input of the amplifier 312.

During resonance of the silicon beam 132 in the region 202 of the accelerometer 160, the oscillator amplifier 300 supplies alternating current to the drive capacitor 141 in the region 202 to vibrate the silicon beam 132 in this region at its resonant frequency. This frequency is sensed by the piezoelectric resistor 148 in the region 202 which provides an input to the oscillator amplifier 300 in order to maintain resonant vibration of the silicon beam 132 in the region 202. Similarly, during resonance of the silicon beam 132 in the region 200 of the accelerometer 160, the oscillator amplifier 318 supplies alternating current to the drive capacitor 141 in the region 200 to vibrate the silicon beam 132 in this region at its resonant frequency. This frequency is sensed by the piezoelectric resistor 148 in the region 200 which provides an input to the oscillator amplifier 318 in order to maintain resonant vibration of the silicon beam 132 in the region 200.

As the accelerometer 160 experiences acceleration, the seismic mass 208 bends the flexure members 192 and 198 to place one of the silicon beams 132 in the regions 200 and 202 in tension and the other of the silicon beams 132 in the regions 200 and 202 in compression. The resonant frequency of one of the silicon beams 132 in the regions 200 and 202 increases, and the resonant frequency of the other of the silicon beams 132 in the regions 200 and 202 decreases. Accordingly, the output frequency from one of the oscillator amplifiers 300 and 318 increases and the output frequency from the other of the oscillator amplifiers 300 and 318 decreases. The outputs from the oscillator amplifiers 300 and 318 are fed back to their respective drive capacitors 141 in the regions 200 and 202 to sustain the new resonant frequencies of the silicon beams 132. This process maintains the resonant vibration frequencies of the silicon beams 132 in the regions 200 and 202 during changes in acceleration experienced by the accelerometer 160.

Thus, the output frequencies from the oscillator amplifiers 300 and 318 change in opposite directions with one increasing and the other decreasing. The amplifier 310 provides an output 324 which is a function of the difference between the output frequencies from the oscillator amplifiers 300 and 318. Thus, the output 324 from the amplifier 310 indicates the amount of acceleration which produced this difference between the output frequencies from the oscillator amplifiers 300 and 318. The polarity of the frequency change in the output 324 of the amplifier 310 indicates the direction of acceleration. The amplifiers 312 provides an output frequency which is a function of the sum of the output frequencies from the oscillator amplifiers 300 and 318. The output from the amplifier 312 can provide an indication of temperature and other factors which influence the vibration frequencies of the silicon beams 132 in the regions 200 and 202 and, if desired, can be used for compensation.

The construction of the accelerometer 160 uses cost effective photolithographic techniques common to the silicon industry and results in an essentially monolithic structure. The performance of the accelerometer 160 is enhanced because the resonant beam structure, i.e. the vibrating beams 132, are sealed in their own vacuum compartments. Thus, any interference between the resonant beam Q and the use of a damping gas for the seismic mass 208 and the flexure members 192 and 198 is avoided. The accelerometer 160 is very sensitive along its input axis 210 while providing a stiff suspension along the directions perpendicular to the input axis 210. The arrangement of the accelerometer 160 provides for common mode rejection in that environmental influences negate one another by the use of dual vibrating silicon beams. Also, the arrangement shown in FIG. 8, and in particular the geometry shown in FIG. 9, can accommodate multiple pairs of silicon beams 132. Thus, a silicon beam 130 can be placed on each side of the four sided structure shown in FIG. 9. Such an arrangement can provide for redundancy in the event of failure. The temperature range of the device is limited only by the active electronics and is not limited by accelerometer itself since the use of polysilicon avoids the need to form pn junctions in the doped areas.

Figure 12:
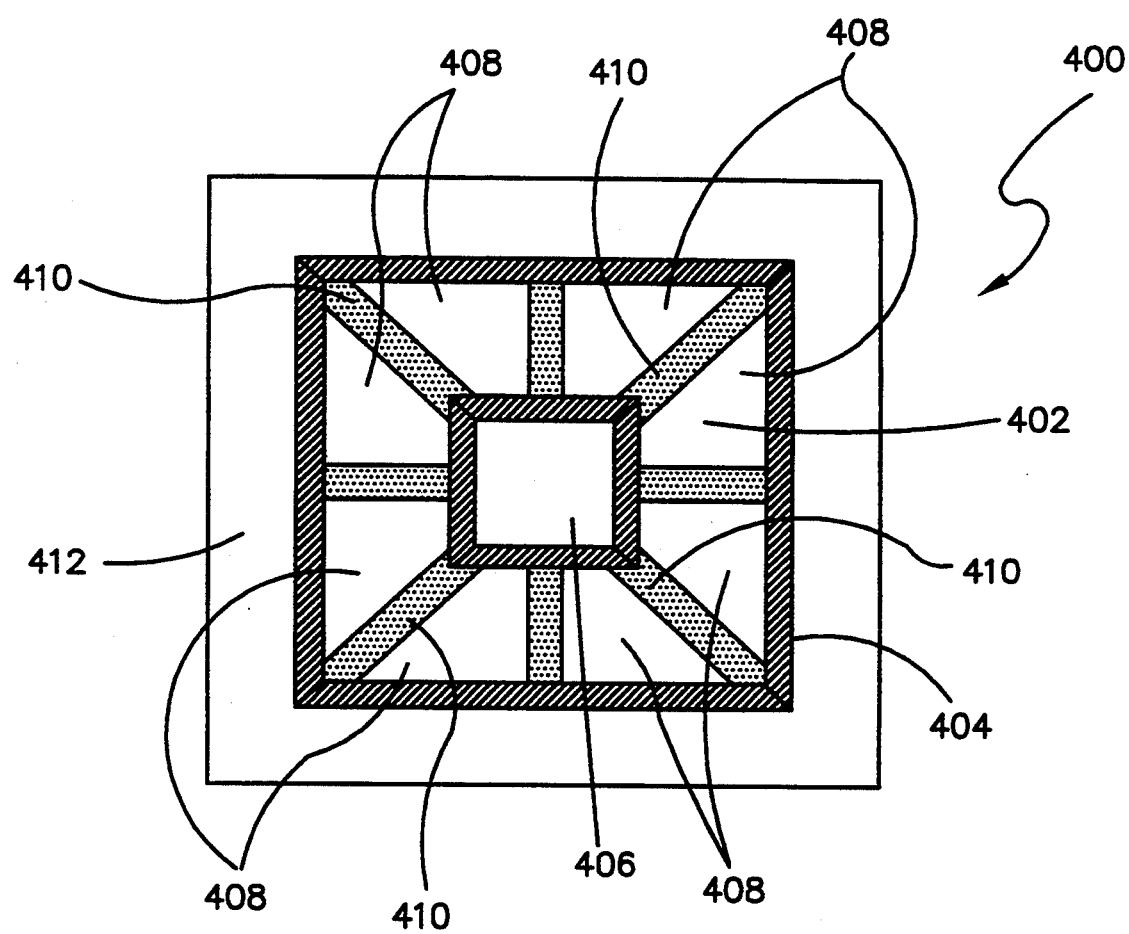
FIG. 12 shows an alternate m/s/b layer for an accelerometer according to the present invention; and, FIG. 13 shows still another alternate m/s/b layer for an accelerometer according to the present invention.

An alternate m/s/b layer 400 is shown in FIG. 12. This m/s/b layer 400 may be used in place of the m/s/b layers 164 and 166 shown in FIGS. 8 and 9. The m/s/b layer 400 has a quadrilateral continuous recess 402. The continuous recess 402 is etched as a closed path in a surface 404 of the m/s/b layer 400. This etching results in a mesa 406 surrounded by the continuous recess 402. As in the case of the m/s/b layers 164 and 166 of FIGS. 8 and 9, the mesa 406 in the m/s/b layer 400 forms a seismic mass with a corresponding mesa in a corresponding second m/s/b layer.

As shown in FIG. 12, the continuous recess 402 is selectively etched entirely through the m/s/b layer 400 in multiple areas 408 to leave webs 410 physically attaching and supporting the mesa 406 to a ridge 412 around the perimeter of the m/s/b layer 400. As in the case of the holes 236 in the m/s/b/layer 164, the areas 408 provide for gas communication through the continuous recess 402. Opposing ones of the webs 410 act as flexure members similar to the flexure member 134 of FIG. 5. Silicon sensors may thus be formed in these opposing webs. The size of webs 410 can be controlled to in turn control the amount of stiffness with which the mesa 406 is supported and the stiffness of the flexure member formed by the webs 410 of the m/s/b layer 400. Accordingly, the sensitivity of the accelerometer can be increased while at the same time the mass of the accelerometer is reduced.

Figure 13:
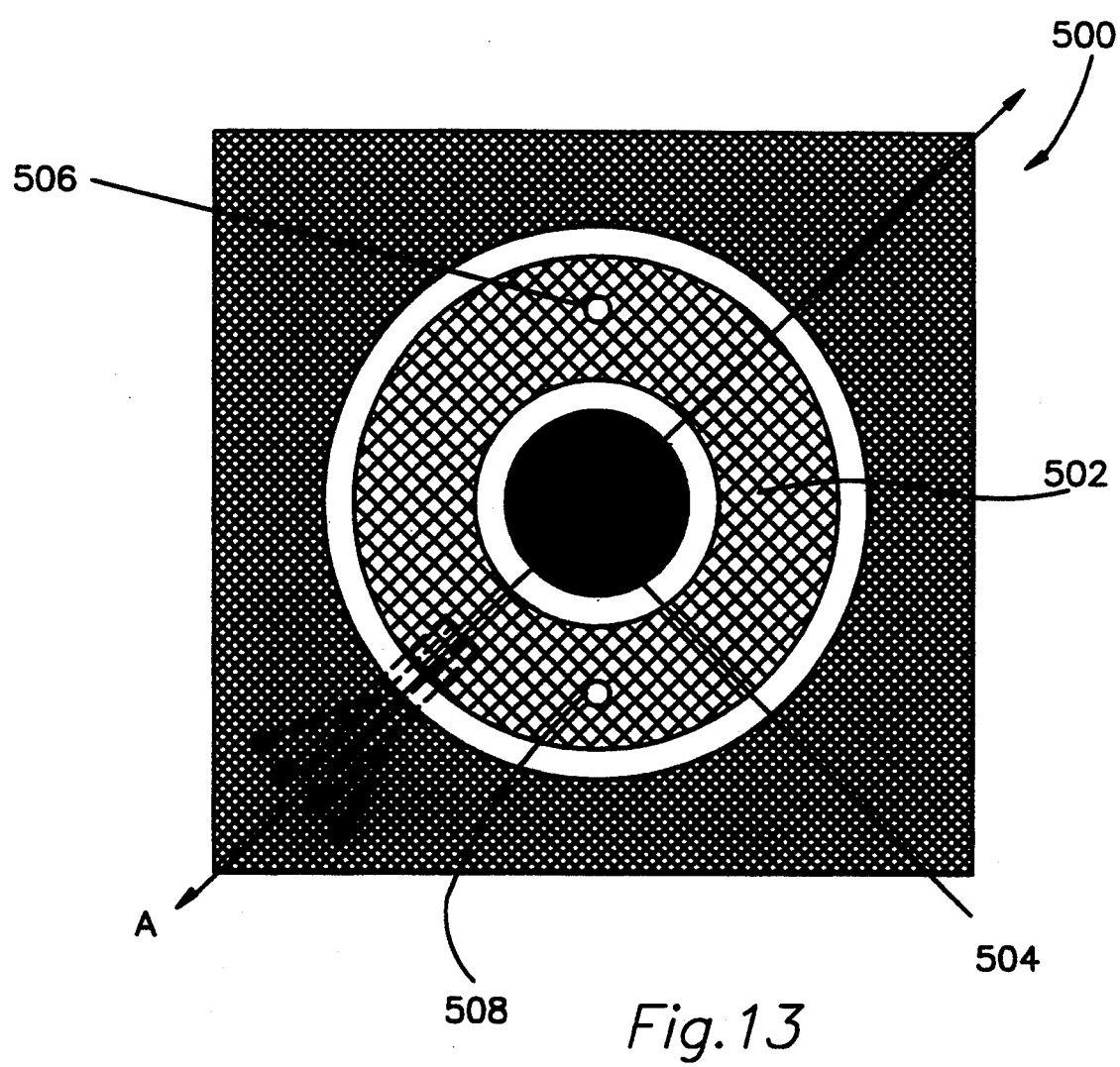

A further alternate m/s/b layer 500 is shown in FIG. 13. The m/s/b layer 500 has a circular continuous recess 502. Whereas a quadrilateral recess may be formed by anisotropic etching, the circular recess 502 is formed by isotropic etching. This etching of the recess 502 results in a circular mesa 504 surrounded by the continuous recess 502. As in the case of the m/s/b layers 164 and 166 of FIGS. 8 and 9, the mesa 504 in the m/s/b layer 500 forms a seismic mass with a corresponding mesa in a corresponding second m/s/b layer. This second m/s/b layer may be formed having the same geometry as the m/s/b layer 500. Two additional layers, similar to the outer layers 162 and 168 shown in FIG. 8, may also be formed, but with circular geometry to match the circular geometry of the m/s/b layer 500. As in the case of the holes 236 in the m/s/b/layer 164, gas holes 506 and 508 may be provided.

Since variations can be made with respect to the invention without departing from the scope of the invention, the scope of the invention is to be limited only by the claims.

I claim:

1. An accelerometer comprising:
   first, second, third, and fourth silicon layers, each of the silicon layers having first and second surfaces;
   the second surface of the second silicon layer and the first surface of the third silicon layer being recessed to form first and second cavities and an acceleration responsive mass between the first and second cavities, the first and second cavities defining (a) first and second silicon flexure members in the first surface of the second silicon layer, respectively and (b) third and fourth silicon flexure members in the second surface of the third silicon layer respectively;
   the first silicon layer having first and second recesses in the second surface thereof, the first recess being arranged so that the first flexure member separates the first cavity and the first recess, and the second recess being arranged so that the second flexure member separates the second cavity and the second recess;
   the fourth silicon layer having third and fourth recesses in the first surface thereof, the third recess being arranged so that the third flexure member separates the first cavity and the third recess, and the fourth recess being arranged so that the fourth flexure member separates the second cavity and the fourth recess;
   first means, situated on the first flexure member, for sensing bending of the first flexure member; and,
   second means, situated on the fourth flexure member, for sensing bending of the fourth flexure member.

2. The accelerometer of claim 1 wherein the first means for sensing comprises a first resonant silicon beam formed in the first flexure member and wherein the second means for sensing comprises a second resonant silicon beam formed in the second flexure member.

3. The accelerometer of claim 2 wherein the first means comprises first vibrating means for vibrating the first silicon beam and wherein the second means comprises second vibrating means for vibrating the second silicon beam.

4. The accelerometer of claim 3 wherein the first vibrating means comprises a first capacitor having at least one electrode on the first silicon beam and wherein the second vibrating means comprises a second capacitor having at least one electrode on the second silicon beam.

5. The accelerometer of claim 4 wherein the at least one electrode of the first capacitor is a doped region of the first silicon beam and wherein the at least one electrode of the second capacitor is a doped region of the second silicon beam.

6. The accelerometer of claim 5 wherein the first means for sensing comprises first vibration sensing means for sensing the vibration of the first silicon beam and wherein the second means for sensing comprises second vibration sensing means for sensing vibration of the second silicon beam.

7. The accelerometer of claim 6 wherein the first means comprises a first amplifier having an input coupled to the first vibration sensing means and an output coupled to the first capacitor, the first amplifier being arranged for controlling the first capacitor to vibrate the first silicon beam at a resonant frequency dependent upon the first vibration sensing means, and wherein the second means comprises a second amplifier having an input coupled to the second vibration sensing means and an output coupled to the second capacitor, the second amplifier being arranged for controlling the second capacitor to vibrate the second silicon beam at a resonant frequency dependent upon the second vibration sensing means.

8. The accelerometer of claim 7 wherein the first means comprises a first vacuum chamber surrounding the first silicon beam and wherein the second means comprises a second vacuum chamber surrounding the second silicon beam.

9. The accelerometer of claim 8 further comprising a gas chamber, the gas chamber including the first and second cavities and the first, second, third, and fourth recesses, the gas chamber containing a gas to damp movement of the acceleration responsive mass and the first and second flexure members, wherein the first and second silicon beams remain in a vacuum free of the gas and therefore the first and second silicon beams vibrate with a high Q.

10. The accelerometer of claim 3 wherein the first means comprises first vibration sensing means for sensing the vibration of the first silicon beam and wherein the second means comprises second vibration sensing means for sensing vibration of the second silicon beam.

11. The accelerometer of claim 10 wherein the first means comprises a first amplifier having an input coupled to the first vibration sensing means and an output coupled to the first vibrating means, the first amplifier being arranged for controlling the first vibrating means to vibrate the first silicon beam at a frequency dependent upon the first vibration sensing means, and wherein the second means comprises a second amplifier having an input coupled to the second vibration sensing means and an output coupled to the second vibrating means, the second amplifier being arranged for controlling the second vibrating means to vibrate the second silicon beam at a frequency dependent upon the second vibration sensing means.

12. The accelerometer of claim 11 wherein the first means comprises a first vacuum chamber surrounding the first silicon beam and wherein the second means comprises a second vacuum chamber surrounding the second silicon beam.

13. The accelerometer of claim 12 further comprising a gas chamber, the gas chamber including the first and second cavities and the first, second, third, and fourth recesses, the gas chamber containing a gas to damp movement of the acceleration responsive mass.

14. The accelerometer of claim 1 wherein the first means comprises a first vacuum chamber arranged to maintain a high Q for the first means and wherein the second means comprises a second vacuum chamber arranged to maintain a high Q for the second means.

15. The accelerometer of claim 14 further comprising a gas chamber, the gas chamber including the first and second cavities and the first, second, third, and fourth recesses, the gas chamber containing a gas to damp movement of the acceleration responsive mass.

16. An accelerometer comprising:
first, second, third, and fourth silicon layers, each of the silicon layers having first and second surfaces;
the second surface of the second silicon layer and the first surface of the third silicon layer being recessed to form a first continuous cavity surrounding an acceleration responsive mass, the first continuous cavity forming a first flexure member in the first surface of the second silicon layer and a second flexure member in the second surface of the third silicon layer, the acceleration responsive mass being arranged to bend the first and second flexure members in response to acceleration;
the first silicon layer having a second continuous cavity in the second surface thereof, the second continuous cavity being arranged so that the first flexure member separates the first and second continuous cavities;
the fourth silicon layer having a third continuous cavity in the first surface thereof, the third continuous cavity being arranged so that the second flexure member separates the first and third continuous cavities; and,
first and second sensing means for sensing bending of first and second beams respectively, the first and second sensing means mounted in the first and second flexure members, respectively, and being arranged with respect to one another for achieving common mode rejection; and wherein
the first sensing means comprises a first silicon beam formed in the first flexure member and wherein the second sensing means comprises a second silicon beam formed in the second flexure member.

17. The accelerometer of claim 16 wherein the first sensing means comprises first vibrating means for vibrating the first silicon beam and wherein the second sensing means comprises second vibrating means for vibrating the second silicon beam.

18. The accelerometer of claim 17 wherein the first vibrating means comprises a first capacitor having at least one electrode on the first silicon beam and wherein the second vibrating means comprises a second capacitor having at least one electrode on the second silicon beam.

19. The accelerometer of claim 18 wherein the at least one electrode of the first capacitor is a doped region of the first silicon beam and wherein the at least one electrode of the second capacitor is a doped region of the second silicon beam.

20. The accelerometer of claim 19 wherein the first sensing means comprises first vibration sensing means for sensing the vibration of the first silicon beam and wherein the second sensing means comprises second vibration sensing means for sensing vibration of the second silicon beam.

21. The accelerometer of claim 20 wherein the first sensing means comprises a first amplifier having an input coupled to the first vibration sensing means and an output coupled to the first capacitor, the first amplifier being arranged for controlling the first capacitor to sustain vibration of the first silicon beam at a resonant frequency dependent upon beam tension of the first vibration sensing means, and wherein the second sensing means comprises a second amplifier having an input coupled to the second vibration sensing means and an output coupled to the second capacitor, the second amplifier being arranged for controlling the second capacitor to sustain vibration of the second silicon beam at a resonant frequency dependent upon beam tension of the second vibration sensing means.

22. The accelerometer of claim 21 wherein the first sensing means comprises a first vacuum chamber surrounding the first silicon beam and wherein the second sensing means comprises a second vacuum chamber surrounding the second silicon beam.

23. The accelerometer of claim 22 further comprising a gas chamber, the gas chamber including the first, second, and third continuous cavities, the gas chamber containing a gas to damp movement of the acceleration responsive mass.

24. The accelerometer of claim 17 wherein the first sensing means comprises first vibration sensing means for sensing the vibration of the first silicon beam and wherein the second sensing means comprises second vibration sensing means for sensing vibration of the second silicon beam.

25. The accelerometer of claim 24 wherein the first sensing means comprises a first amplifier having an input coupled to the first vibration sensing means and an output coupled to the first vibrating means, the first amplifier being arranged for controlling the first vibrating means to sustain vibration of the first silicon beam at a resonant frequency dependent upon beam tension of the first vibration sensing means, and wherein the second sensing means comprises a second amplifier having an input coupled to the second vibration sensing means and an output coupled to the second vibrating means, the second amplifier being arranged for controlling the second vibrating means to sustain vibration of the second silicon beam at a resonant frequency dependent upon beam tension of the second vibration sensing means.

26. The accelerometer of claim 25 wherein the first sensing means comprises a first vacuum chamber surrounding the first silicon beam and wherein the second sensing means comprises a second vacuum chamber surrounding the second silicon beam.

27. The accelerometer of claim 26 further comprising a gas chamber, the gas chamber including the first, second, and third continuous cavities, the gas chamber containing a gas to damp movement of the acceleration responsive mass.

28. The accelerometer of claim 16 wherein the first sensing means comprises a first vacuum chamber arranged to maintain a high Q for the first sensing means and wherein the second sensing means comprises a second vacuum chamber arranged to maintain a high Q for the second sensing means.

29. The accelerometer of claim 28 further comprising a gas chamber, the gas chamber including the first, second, and third continuous cavities, the gas chamber containing a gas to damp movement of the acceleration responsive mass.

30. The accelerometer of claim 16 wherein the first continuous cavity is quadrilateral.

31. The accelerometer of claim 16 wherein the first continuous cavity is circular.

32. The accelerometer of claim 16 wherein the second surface of the second silicon layer and the first surface of the third silicon layer are selectively recessed entirely through the corresponding layer so as to form a first continuous cavity surrounding an acceleration responsive mass and so as to leave webs for supporting the acceleration responsive mass.

* * * * *